Sept. 27, 1927.

E. H. DIECKMANN

TRACTOR

Filed Jan. 19, 1924

1,643,375

Inventor:
EDWARD H. DIECKMANN.
John H. Bruninga
Attorney.

Patented Sept. 27, 1927.

1,643,375

UNITED STATES PATENT OFFICE.

EDWARD H. DIECKMANN, OF FLORISSANT, MISSOURI.

TRACTOR.

Application filed January 19, 1924. Serial No. 687,220.

This invention relates to tractors, and more particularly to tractors used for farming operations, as described in my Patent No. 1,324,309, granted December 9, 1919.

In the use of a tractor it is frequently necessary to make extremely short turns and under disadvantageous conditions. Thus where the tractor is used to draw a plow and the field is plowed by starting from the outside and turning to the left, the front or steering wheels are necessarily run onto the plowed ground at the end of a furrow and at the turn. In such a case the front wheels, even when turned sharply, tend to move forward rather than swing the tractor. Moreover the front wheels are only turned with difficulty. Accordingly the steering of a tractor at the turn is at best a difficult operation.

One of the objects of this invention, therefore, is to provide a tractor with means for executing a short turn.

Another object is to provide novel means for driving a steering wheel so that such wheel may assist in executing the turn.

Another object is to provide a tractor with means for driving a steering wheel which is off-set from the center of the tractor.

Further objects will appear from the detail description taken in connection with the accompanying drawing in which.

Figure 1:
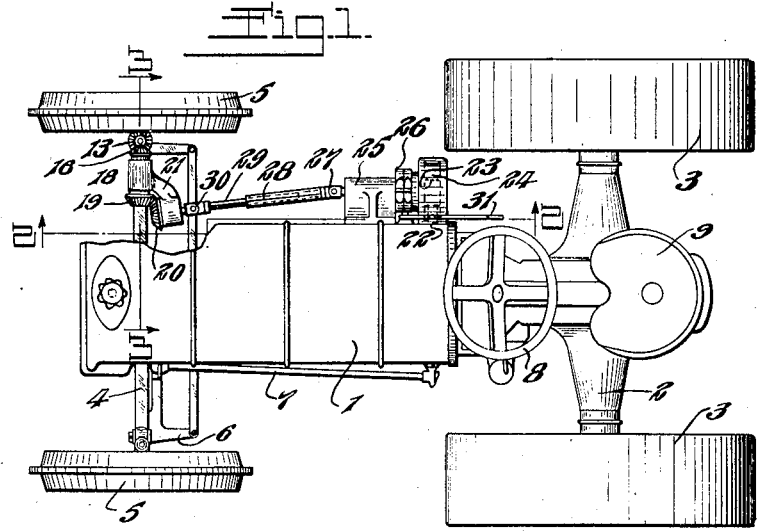
Figure 1 is a plan view of a tractor embodying this invention, with parts broken away to show the driving connections.
Figure 2:
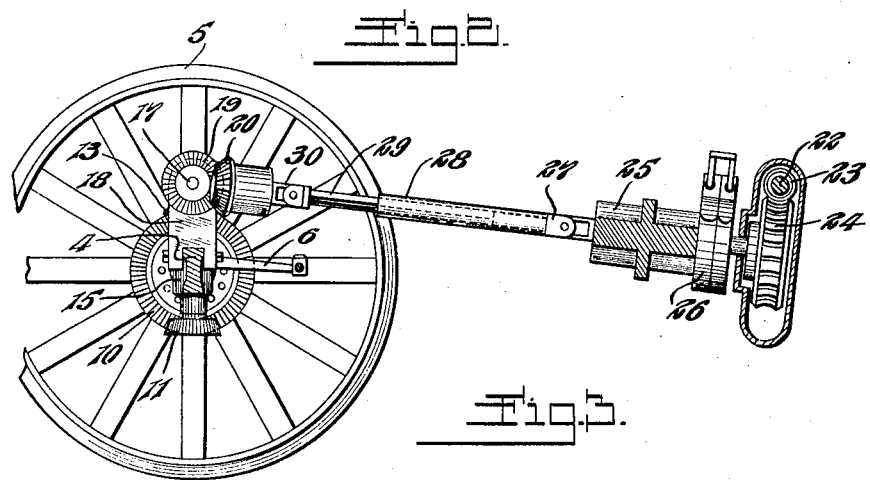
Figure 2 is a section, somewhat enlarged, taken on line 2—2, Figure 1.
Figure 3:
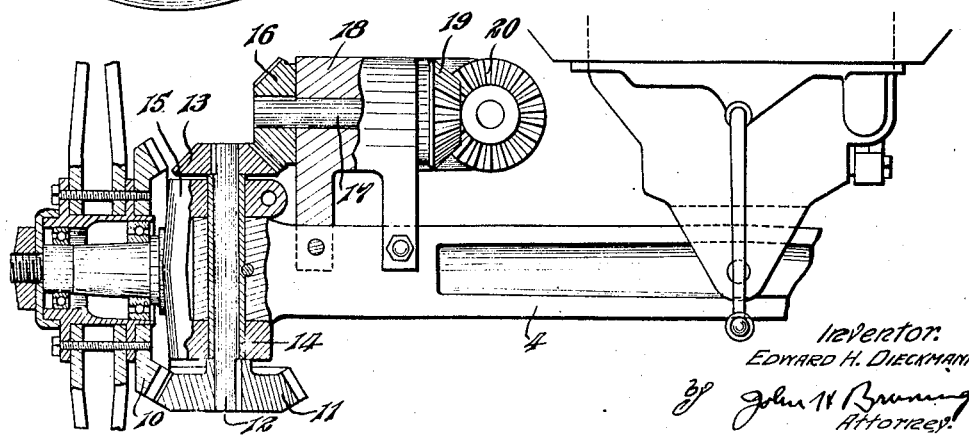
Figure 3 is a partial section, again somewhat enlarged, on line 3—3, Figure 1.

Referring to the accompanying drawing, 1 designates generally the body or frame of a tractor which ordinarily includes a suitable motor for driving the same. This frame may be provided with an axle 2 on which are mounted main traction wheels 3 suitably connected to be driven by the motor. Suitably mounted on the frame 1 is a carrier 4 adapted to carry the ground wheels 5. These ground wheels are connected by the usual connections 6 and 7 with a steering wheel 8 mounted adjacent the driver's seat 9. The carrier 4 is usually pivoted at the center of the frame so as to permit a rocking movement in a vertical plane in order that the ground wheels 5 may accommodate themselves to inequalities of the ground. The features thus far set forth are all of a construction well known in the art, and, therefore, need no further description.

In accordance with this invention, means for driving one of the steering ground wheels 5 are provided. Toward this end, a bevel gear 10 may be mounted in any suitable manner on the hub of one of the ground wheels 5, in the present case the right hand one. The gear 10 is adapted to mesh with a bevel pinion 11 mounted on the lower end of a vertical shaft or spindle 12 carrying at its upper end a bevel gear 13. The shaft 12 may be mounted in a bearing comprising a sleeve 14 rigidly mounted in the carrier 4. The sleeve 14 also provides a steering pivot about which the knuckle 15 on which the ground wheel 5 is mounted, may turn. The bevel gear 13 is adapted to mesh with a similar gear 16 carried by a horizontal shaft 17 mounted in a bearing 18 rigidly fixed to the carrier 4 and extending therealong toward the center of the frame. The shaft 17 carries at its inner end another bevel gear 19 adapted to mesh with a similar gear 20 mounted on a stub-shaft having a bearing in a bracket 21 on the bearing 18.

The ordinary tractor, at least of one well known type, is provided with means for mounting an auxiliary shaft 22 to protrude from one side of the frame or body and adapted to carry an ordinary pulley, by means of which auxiliary apparatus may be driven from the tractor motor. In accordance with the present invention, such pulley may be replaced by a worm 23 adapted for cooperation with a worm-wheel 24 for driving a stub shaft mounted in a bearing 25 which is mounted on the side of the frame. A reversing clutch 26 may be interposed between the worm-wheel 24 and said stub shaft. This clutch may be of the planetary change gear type, such as used on a certain well known type of automobile, and adapted for manipulation to connect said stub shaft to the wheel 24 to be driven thereby, in either forward or reverse direction, or to release said shaft. This shaft may be connected by a universal joint 27 to a telescoping drive shaft comprising an outside member 28 and an inside member 29 adapted to slide longitudinally within the member 28, but splined thereto so as to be driven thereby. The member 29 may be connected by a second universal joint 30 with the stub shaft carrying the bevel gear 30. This telescoping shaft with its universal joints provides a flexible driving connection from the motor to the shaft 12 for driving the ground wheel 5. Suitable manipulative means, such as the operating lever 31 may be provided for manipulating the clutch 26. It will be noted that the flexible connection is made to the gear 19 on the inner end of the shaft in the bearing 18. This construction locates these parts near the center of the frame so as to provide ample room to allow the rear of the ground wheel 5 to swing inwardly in making a turn to the right.

It will be seen that this invention provides a driving connection from the motor to only one of the ground wheels 5. This is a flexible connection so that the carrier 4 may move to accommodate itself to inequalities of the ground without disturbing the driving connection. The driving connections are made in such a way that the steering movement of the wheels 5 is in no way interfered with and the right hand wheel may be driven simultaneously with steering operation. It will be noted that driving connections are made to only one front wheel so that there is a driven ground wheel laterally of the center of the frame. This is advantageous since it not only simplifies construction but attains an improved result. Taking the case of plowing from the outside of a field and making left turns, by driving, for instance, the right hand ground wheel, maximum assistance in carrying out the turning movement is provided. Even where the front wheels are on plowed ground, the fact that the drive is to the ground wheel laterally of the tractor body, not only eases the effort on the steering wheel, but this driven ground wheel will apply a turning movement to the tractor in such a manner as to execute a short turn. It is, therefore, unnecessary for the tractor wheels to push the front wheels when turned, but the drive thereto supplements the effort of the traction wheels. Similarly when making a right turn the tractive effort of the ground wheel is such as to supplement the tractor wheels, especially since any desired supplemental action can be obtained by the forward and reverse drive to the ground wheel independent of the traction wheels. The drive may, of course, be applied to the left hand instead of the right in such cases as would make this connection more advantageous. In either case, that steering wheel which is driven, being off-set from the center of the frame, will have a better turning effort in making the turn to the opposite side. It will be clear, therefore, that the driver in the seat 9 will have better control of the operation of the tractor since he is capable of manipulating not only the drive of the traction wheels 3, but also the drive of one of the ground wheels 5. The driving connections will in no way interfere with the steering operation. When the clutch 26 is in a position to release the driving connections, the wheels 5 will be free for operation by the steering wheel 8. The clutch 26 can be thrown in to drive the wheel 5 while the tractor is traveling, and under such conditions the ground wheel 5 may be steered from the wheel 8 even while the driving connection is active. The ground wheel 5 may, however, be driven to turn the tractor either to the right or left even when the traction wheels are not driven.

It is obvious that various changes may be made in details of construction without departing from the spirit of this invention; it is, therefore, to be understood that this invention is not to be limited to the specific details shown and described.

Having thus described the invention, what is claimed is:

1. In a tractor of the farm type having an automotive organization which includes a motor, propelling wheels driven by the motor, an auxiliary drive shaft driven by the motor, a pivoted front axle having steering wheels thereon offset from the pivot thereof, and connections from said auxiliary drive shaft including a reversible clutch adapted to drive one of said wheels, for steering purposes.

2. In a tractor of the farm type having an automotive organization which includes a motor, propelling wheels driven by the motor, an auxiliary drive shaft driven by the motor, a pair of steering wheels offset laterally from the center line of the tractor, and connections from said auxiliary drive shaft including a reversible clutch adapted to drive one of said wheels for steering purposes.

3. In a tractor of standard manufacture having a frame, a motor thereon, traction wheels for driving the frame, a pivoted front axle, steering wheels on said axle offset from the middle of the frame, and an auxiliary power shaft driven by the motor and accessible from the outside of the frame; worm gearing mountable on the frame at said auxiliary shaft and adapted for connection to be driven thereby, a bracket adapted for mounting on the front axle on one side of the pivot thereof, bevel gearing on said bracket adapted for driving one of the steering wheels, a flexible and extensible shaft connecting said worm and bevel gearings, and reversible connections between said worm gearing and said flexible shaft.

In testimony whereof I affix my signature this 9th day of January, 1924.

EDWARD H. DIECKMANN.